No. 744,758. Patented November 24, 1903.

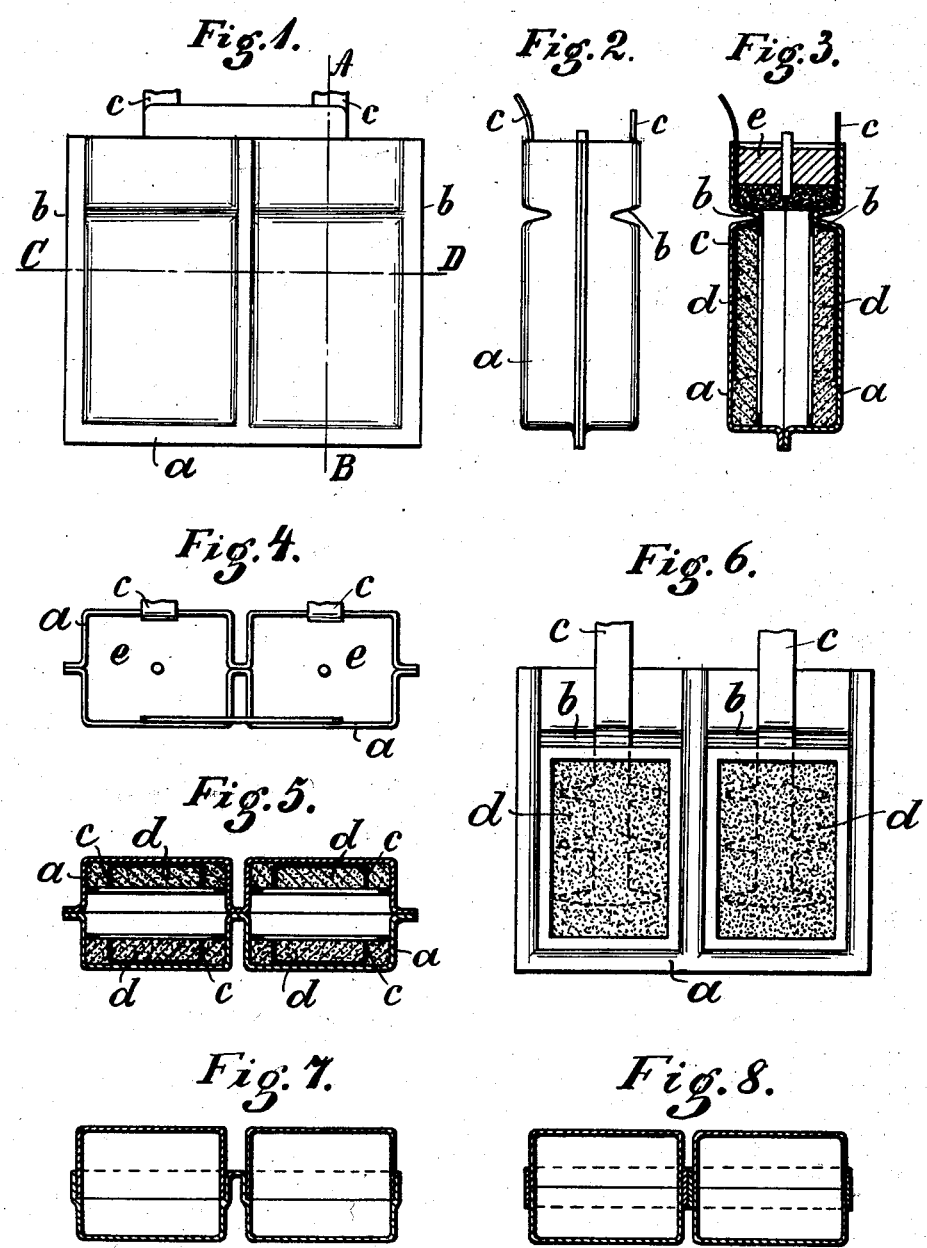

UNITED STATES PATENT OFFICE.

WILHELM HEYM, OF BERLIN, GERMANY.

POCKET-BATTERY.

SPECIFICATION forming part of Letters Patent No. 744,758, dated November 24, 1903.

Application filed August 15, 1903. Serial No. 169,614. (No model.)

*To all whom it may concern:*

Be it known that I, WILHELM HEYM, manufacturer, a subject of the King of Prussia, Emperor of Germany, residing at 15 Schiffbauerdamm, Berlin, Germany, have invented certain new and useful Improvements in Pocket-Batteries; and I do hereby declare that the following is a full, clear, and exact description.

The present invention relates to a pocket-battery the elements of which are composed of two separate holders serving at the same time as electrode-carriers. Each holder, constructed in the well-known manner of celluloid and containing the active mass, is so formed that upon the putting together of the elements between the two layers of material there is left a space for the electrolyte. Each holder has a contraction above the active mass. The space above the contractions is filled with a suitable filling material and sealed by a molten material. In contradistinction to the pocket-batteries which are formed of galvanic elements in the present invention the active mass is utilized in the manner of a secondary battery. There is, however, the important difference from the secondary batteries that in the present invention there is only a question of a single formation and a single discharge.

In previous attempts to utilize secondary batteries as pocket-batteries efforts have always been made to copy the large stationary or traction batteries on a small scale; but in this regard has not been had to the fact that in the case of pocket-batteries we have quite a different problem, as in the case of ordinary secondary batteries.

In pocket-batteries the matter of first importance is a light weight and great capacity with simple and cheap construction. Against these conditions the requirement for a quick charging, a durability for several years, and an always present effect are of minor importance.

According to this invention it is possible entirely to disregard the renewal of the battery by loading, because the cost of construction of the battery in comparison to its capacity is so small that an exhausted battery can simply be replaced by a new one.

The pocket-battery forming the object of the present application is illustrated in the accompanying drawings, in which—

Figure 1 shows the complete battery in front elevation. Fig. 2 shows the corresponding side elevation. Fig. 3 is a section on the line A B of Fig. 1. Fig. 4 shows a plan view of the pocket-battery. Fig. 5 is a section on the line C D of Fig. 1. Fig. 6 shows the one half of the battery before the addition of the second half. Figs. 7 and 8 illustrate other methods of uniting the celluloid holders.

The celluloid holders $a$ have the contractions $b$, which reach almost to the middle of the height of the borders. In the two cavities of each holder $a$ there is placed a thin lead strip $c$, in the manner shown in Figs. 3 and 5 and so that the two lead strips can be united to one another on one side for the purpose of connecting up the elements in the manner illustrated in Fig. 1. After this there is placed in the celluloid holders, also in the manner shown in Figs. 3 and 5, a mass $d$ of oxids of lead, and after the hardening and drying this is specially secured by covering the edges with rubber, cement, or dissolved celluloid. After this the two celluloid holders are connected together in the manner shown in the drawings, so that between the two layers of active material there is so large a space for the electrolyte that self-discharging is practically impossible. Through the passage of the electric current the lead oxids in the active mass are transformed. The formative electrolyte is then removed and is replaced by a gelatin electrolyte. The space above the contraction $b$, around which the lead strips $c$ are bent, is then partially stopped up with asbestos wool, and the space still remaining is filled with a molten material $e$.

The above-described pocket-battery gives in consequence of the avoidance of any lead frame or plate and the application of thin toothed electrode strips a maximum of active mass. The weight amounts to only about one-quarter of that of the lightest secondary batteries hitherto known. Moreover, production is extremely simple and cheap, and there is great permanency in consequence of the method of bedding the mass in the boxes. The application of only one positive and one negative plate of moderate thickness and a great distance between the plates prevents the self-discharging, which is well known to be serious in small secondary batteries. Instead of lead one might also use another metal and instead of oxids of lead any other suitable active mass.

Moreover, it is by no means of capital importance for the principle of the present invention that the filling should first be transformed by means of an electric current. It is only of importance that the celluloid holders be provided with a mass which will give a single discharge and possess a simple construction of the battery with great capacity. Further, it is obvious that instead of celluloid any other suitable material might be employed.

Having now described my invention and in what manner the same is to be performed, what I claim, and desire to secure by Letters Patent, is—

In pocket-batteries the combination of two holders put together so as to form a vessel, each holder containing an active mass and a metal strip and having a contraction, with an electrolyte filled in the space between the two holders and a seal above said contractions, substantially as described.

In witness whereof I have hereunto set my hand in presence of two witnesses.

WILHELM HEYM.

Witnesses:
RUDOLF FUSTINSKY,
GEORG BARTZ.